United States Patent
Song (10) Patent No.: US 10,836,352 B2
(45) Date of Patent: Nov. 17, 2020

(54) VEHICLE STARTING CONTROL SYSTEM BY USING FACE PERCEPTION DATA AND METHOD THEREOF

(71) Applicant: STC Corporation Co., Ltd., Hwaseong-si (KR)

(72) Inventor: Myung Seob Song, Seoul (KR)

(73) Assignee: STC CORPORATION CO. LTD, Hwaseong-si (KR)

( * ) Notice: Subject to any disclaimer, the term of this patent is extended or adjusted under 35 U.S.C. 154(b) by 0 days.

(21) Appl. No.: 16/286,847

(22) Filed: Feb. 27, 2019

(65) Prior Publication Data
US 2020/0269812 A1    Aug. 27, 2020

(51) Int. Cl.
*B60R 25/25* (2013.01)
*B60R 25/04* (2013.01)
*G06K 9/00* (2006.01)
*B60W 40/08* (2012.01)

(52) U.S. Cl.
CPC .............. *B60R 25/25* (2013.01); *B60R 25/04* (2013.01); *B60W 40/08* (2013.01); *G06K 9/00288* (2013.01); *G06K 9/00845* (2013.01); *B60W 2040/0809* (2013.01)

(58) Field of Classification Search
CPC ....... B60R 25/24; B60R 25/04; B60R 25/241; B60R 2325/101; B60R 25/00; B60R 2325/205; B60R 16/037; B60R 25/10; B60R 25/102; B60R 25/20; B60R 25/243
USPC ....................................................... 340/5.72
See application file for complete search history.

(56) References Cited

U.S. PATENT DOCUMENTS

| 10,445,603 B1* | 10/2019 | Quach ................ G06K 9/00845 |
| 2008/0030301 A1* | 2/2008 | Terao .................... B60R 25/252 340/5.53 |
| 2010/0220892 A1* | 9/2010 | Kawakubo ............. A61B 5/163 382/103 |
| 2011/0091079 A1* | 4/2011 | Yu-Song ............ G06K 9/00275 382/118 |
| 2013/0073114 A1* | 3/2013 | Nemat-Nasser ........ B60R 25/25 701/1 |
| 2013/0096733 A1* | 4/2013 | Manotas, Jr. ....... F02N 11/0807 701/2 |
| 2013/0311001 A1* | 11/2013 | Hampiholi .............. B60R 25/25 701/1 |

(Continued)

FOREIGN PATENT DOCUMENTS

KR    10-1469862 B1    12/2014

*Primary Examiner* — Thomas S McCormack
(74) *Attorney, Agent, or Firm* — LRK Patent Law Firm (57) ABSTRACT

A vehicle starting control system using face perception data includes a smart device which is installed with a camera that stores unique information of a black box module, shoots the driver, extracts face perception data from the image of the driver taken, stores extracted face perception data and sends face perception data to the black box module on the vehicle, and a black box module which stores smart device number of the driver installed on the vehicle and face perception data of the driver, compares smart device number and face perception data received with smart device number and face perception data stored, opens doors of the vehicle by controlling a vehicle door locking module if data agree, receives brake pedal data showing brake pedal status of the registered driver and controls the starting key of the vehicle.

5 Claims, 6 Drawing Sheets

(56) References Cited

U.S. PATENT DOCUMENTS

| | | | | |
|---|---|---|---|---|
| 2014/0152422 A1* | 6/2014 | Breed | ................... | G07C 9/32 |
| | | | | 340/5.52 |
| 2015/0102898 A1* | 4/2015 | Huennekens | ...... | G07C 9/00174 |
| | | | | 340/5.6 |
| 2017/0197568 A1* | 7/2017 | DeCia | ................... | B60R 16/037 |
| 2018/0354363 A1* | 12/2018 | Rolfes | ................... | B60K 28/04 |
| 2018/0362019 A1* | 12/2018 | Singh | ................... | G06F 3/013 |
| 2019/0147259 A1* | 5/2019 | Molin | ................... | G06F 16/743 |
| | | | | 382/104 |

* cited by examiner

VEHICLE STARTING CONTROL SYSTEM BY USING FACE PERCEPTION DATA AND METHOD THEREOF

BACKGROUND OF THE INVENTION

1. Field of the Invention

This invention relates to the removal of vehicle keys by opening vehicle doors and starting vehicles by using face perception data. In general, remote vehicle keys are widely used to open and close vehicle doors by setting a unique serial number for a vehicle and authenticating the serial number. The remote key described above must be carried at all times.

2. Description of Related Art

Figure 1:
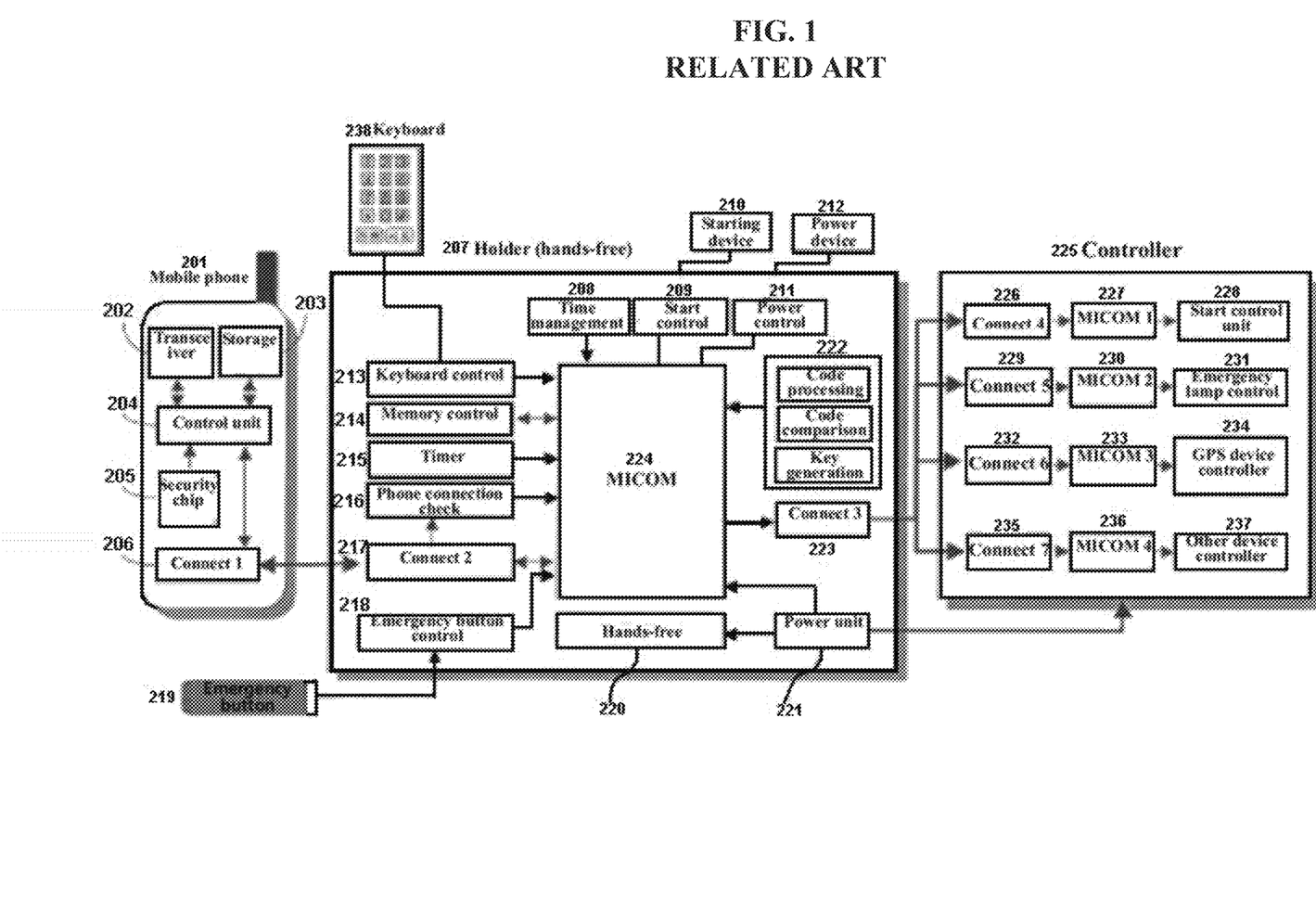
FIG. 1 is a block diagram of a conventional vehicle user authentication device connected to a mobile phone.

Background art related to this invention is presented by Korean Application Patent No. 10-1469862 (published on Dec. 8, 2014). FIG. 1 is a block diagram of a conventional vehicle user authentication device connected to a mobile phone. In FIG. 1, the conventional vehicle user authentication device connected to a mobile phone is comprised of a holder (207) and controller (225). MICOM is installed on the holder (207) and controller (225). The holder (207) is comprised of a connect 2 (217) connected to the mobile phone (201), mobile phone connection check (216), timer (215), memory control unit (214), keyboard control unit (213), keyboard (238) to enter password and press power and start buttons, start control unit (209) that controls vehicle start, power control unit (211), connect 3 (223) connected to a device controller (225), power unit (221), emergency button control unit (218), hands-free (220) and MICOM (224) that controls all parts. The device controller (225) is comprised of connects 4~7, MICOM 1~4, start control unit (228) that controls the starting device as instructed by MICOM (227) after the vehicle is started while controlling operation of the starting device using vehicle key, emergency lamp controller (231), GPS tracking controller (234) and other device controller (237). Connect 2 (217) is connected to the mobile phone (201) to transmit and receive data via wired/wireless network. The control unit (204) generates an authentication code (222) by combining the mobile phone number received (security code if a security chip (205) is attached for security purpose) and the code of the memory control unit (214) stored in the holder (207), compares the code with the authentication code (222) received from the mobile phone (201), and generates an operation key (222) that commands operation of the controller (225) if the codes agree. MICOM 1~4 of the controller (225) are connected to connect 3 (223) via connects 4~7. MICOM 1~4 of the controller (225) check generation of the operation key via wired/wireless network and disable operation of the vehicle by performing one or all of the functions including disabling of the starting device (228), constant flashing (231) of the emergency lamp, and operation (234) of the GPS tracking device, if the key has not been generated. They would instruct the vehicle to function properly in the opposite case if the key has been generated. The mobile phone connection check (216) of the holder (207) constantly checks connection of the mobile phone (201) and provides this information to MICOM (224). The timer (215) constantly checks time at which the vehicle was started and flashes (231) the emergency lamp several times in short time if the vehicle was not started for certain time. GPS is also operated automatically (234) to immediately stop GPS (234) if the initial code received is appropriate. GPS continues to operate (234) if an emergency code like stolen code is received, periodically flashing (231) the emergency lamp. The hands-free (220) allows for the use of wired/wireless hands-free. The keyboard control unit (213) is used to start the vehicle from the holder (207) using the keyboard (238) instead of using the vehicle key. The keyboard (238) is comprised of number pads to enter password, power button and start button. If password and power button are pressed on the keyboard (238), MICOM (207) checks password stored in the memory control unit (214) and turns power of the vehicle ON via the power control unit (211) if password is correct. If the start button is pressed, MICOM (224) starts the vehicle via the start control unit (209).

SUMMARY OF THE INVENTION

The conventional user authentication method above using a mobile phone has a problem that identity of the user cannot be verified. In addition, the conventional user authentication method above involves excessive cost because it has complex composition and requires separate installation of MICOM. The vehicle starting control system using face perception data of this invention intended to resolve problems of the conventional art above and the vehicle starting method thereof is intended to open and close vehicle doors and start vehicles using face perception data. In addition, another purpose of this invention is to embody the system using black boxes installed on vehicles and to preheat vehicles by starting vehicles from a remote place in the winter.

The vehicle starting control system of this invention using face perception data with the purpose above is comprised of a smart device, which is installed with a camera that stores unique information of a black box module, shoots the driver, extracts face perception data from the image of the driver taken, stores extracted face perception data and sends face perception data to the black box module on the vehicle, and a black box module, which stores smart device number of the driver installed on the vehicle and face perception data of the driver, compares smart device number and face perception data received with smart device number and face perception data stored, opens doors of the vehicle by controlling a vehicle door locking module if data agree, receives brake pedal data showing brake pedal status of the registered driver and controls the starting key of the vehicle.

Advantageous Effects

The vehicle starting control system of this invention comprised of the above using face perception data and method thereof has an effect of verifying the driver using face perception data. In addition, this invention has another effect of removing the necessity of vehicle keys. In addition, this invention has another effect of preheating a vehicle parked in a parking lot from home in the winter.

DETAILED DESCRIPTION OF THE INVENTION

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

The vehicle starting control system of this invention with the purpose above using face perception data and method thereof can be described using FIGS. 2 through 5 as below.

Figure 2:
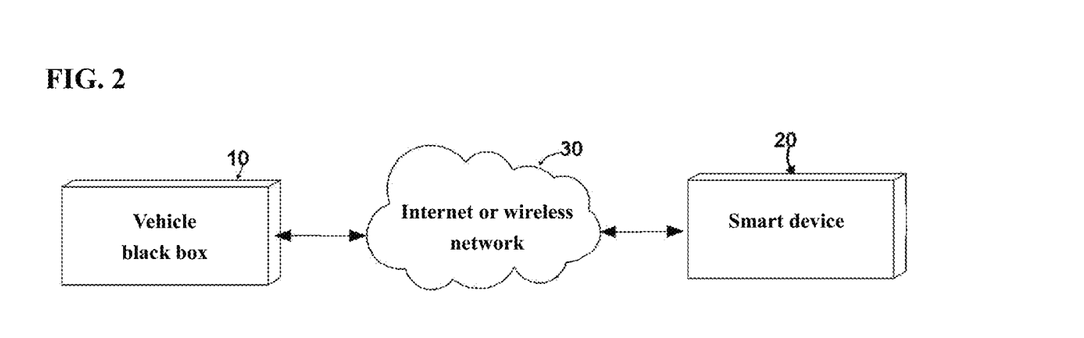
FIG. 2 is a block diagram illustrating embodiment 1 of the vehicle starting control system of this invention using face perception data.

FIG. 2 is a block diagram illustrating embodiment 1 of the vehicle starting control system of this invention using face perception data. In FIG. 2, embodiment 1 of the vehicle starting control system of this invention using face perception data is comprised of a smart device (10), which is installed with a camera that stores unique information of a black box module, shoots the driver, extracts face perception data from the image of the driver taken, stores extracted face perception data and sends face perception data to the black box module on the vehicle, a black box module (20), which stores smart device number of the driver installed on the vehicle and face perception data of the driver, compares smart device number and face perception data received with smart device number and face perception data stored, opens doors of the vehicle by controlling a vehicle door locking module if data agree, receives brake pedal information showing brake pedal status of the registered driver and controls the starting key of the vehicle, and an internet or wireless communication network (30) that connects the smart device and black box module via network. In the above, the black box module (20) can feedback door opening data and starting key result data to the smart device. The smart device can display door opening data and starting key result data on the display unit. In the above, the black box module can be installed and operated by adding this invention to an existing module mounted on the vehicle to shoot front and rear sides, adding this function to a new black box module, or installing a separate module.

Figure 3:
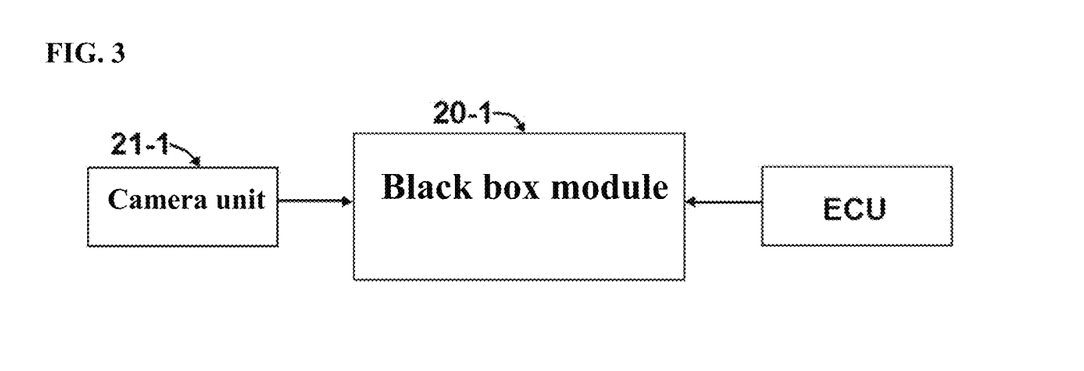
FIG. 3 is a block diagram illustrating embodiment 2 of the vehicle starting control system of this invention using face perception data.

FIG. 3 is a block diagram illustrating embodiment 2 of the vehicle starting control system of this invention using face perception data. In FIG. 3, embodiment 2 of the vehicle starting control system of this invention using face perception data stores face perception data of a registered driver. It is comprised of a black box module (20-1), which extracts face perception data from driver's image data taken by a black box module camera (21-1) on the vehicle, opens doors of the vehicle by controlling a door locking module if extracted face perception data agree with existing face perception data, and turns on the vehicle starting key by receiving brake pedal data showing brake pedal status of the driver from ECU, and an ECU that sends brake pedal data to the black box module. In the above, the black box module camera shoots the deriver's facial image after checking from ECU that RPM of the engine is 0 or the starting key is OFF. When the facial image of the person trying to drive the vehicle is taken by the black box module, data are sent to ECU and feedback is received to verify starting key data or engine RPM data from ECU periodically.

Figure 4:
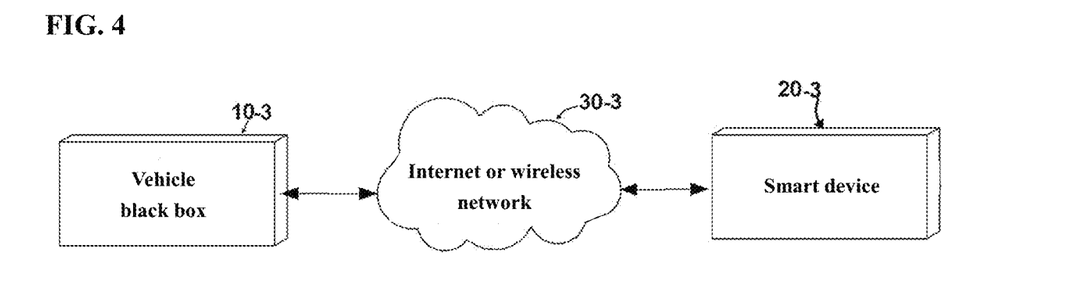
FIG. 4 is a block diagram illustrating embodiment 3 of the vehicle starting control system of this invention using face perception data.

FIG. 4 is a block diagram illustrating embodiment 3 of the vehicle starting control system of this invention using face perception data. In FIG. 4, embodiment 3 of the vehicle starting control system of this invention using face perception data is comprised of a smart device (10-3), which is installed with a camera that stores unique information of a black box module, shoots the driver, extracts face perception data from the image of the driver taken, stores extracted face perception data and sends face perception data and "preheat" text data to the black box module on the vehicle, a black box module (20-3), which stores smart device number of the driver installed on the vehicle and face perception data of the driver, receives face perception data, "preheat" text data and smart device number data from the smart device, compares smart device number and face perception data received with smart device number and face perception data stored and preheats the vehicle by turning the starting key ON if smart device number and face perception data agree, and an internet or wireless communication network (30-3) that connects the smart device and black box module via network. In the above, the black box module can send starting key result data to the smart device. The smart device can display starting key result data on the display unit.

Figure 5:
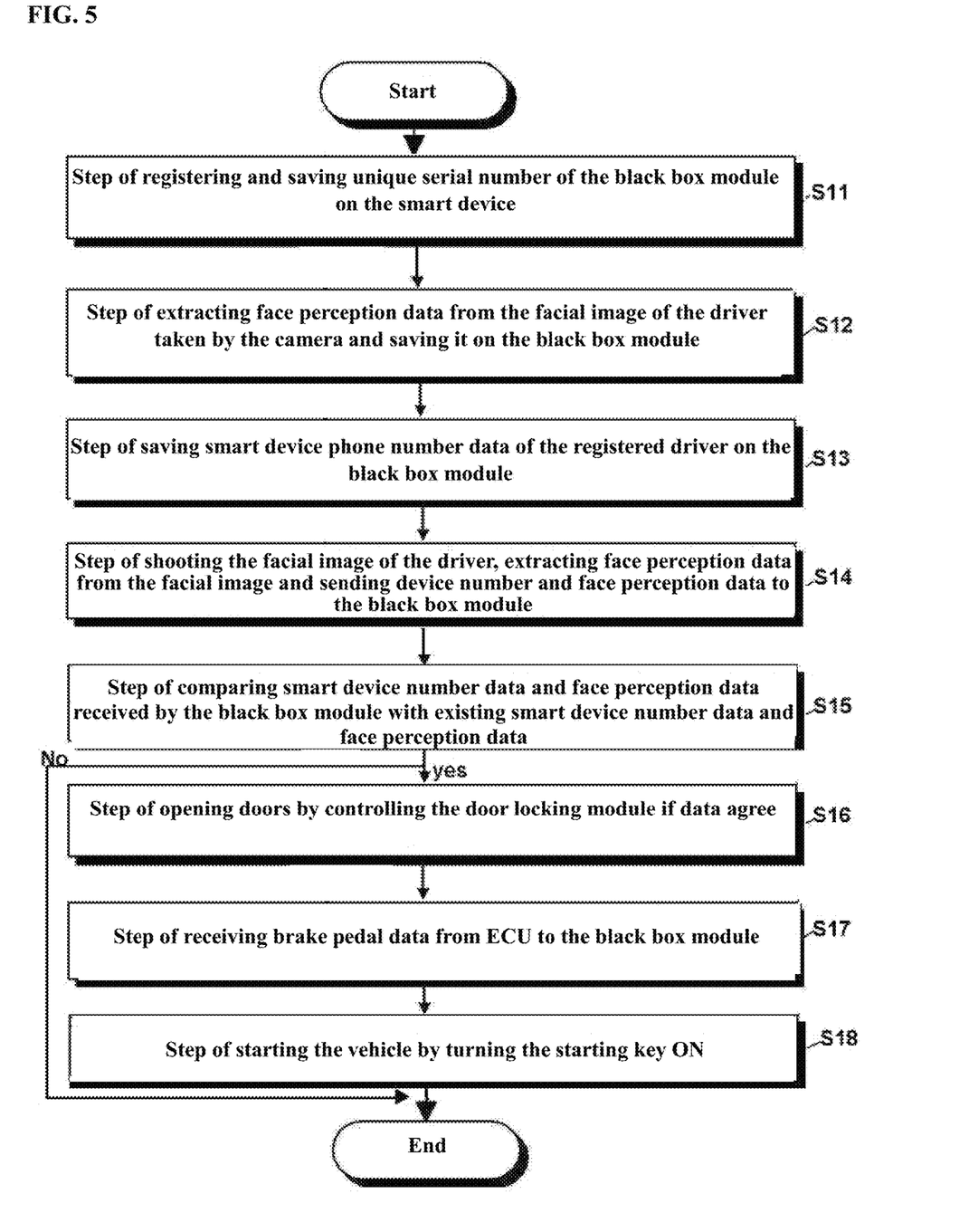
FIG. 5 is a flow chart illustrating embodiment 1 of the vehicle starting control system of this invention using face perception data.

FIG. 5 is a flow chart illustrating embodiment 1 of the vehicle starting control system of this invention using face perception data. In FIG. 5, embodiment 1 of the vehicle starting control system of this invention using face perception data includes a step (S11) of registering and saving unique serial number of the black box module on the smart device, a step (S12) of extracting face perception data from the facial image of the driver taken by the camera and saving it on the black box module, a step (S13) of saving smart device phone number data of the registered driver on the black box module, a step (S14) of shooting the facial image of the driver, extracting face perception data from the facial image and sending device number and face perception data to the black box module, a step (S15) of comparing smart device number data and face perception data received by the black box module with existing smart device number data and face perception data, a step (S16) of opening doors by controlling the door locking module if data agree, a step (S17) of receiving brake pedal data from ECU to the black box module, and a step (S18) of starting the vehicle by turning the starting key ON. In addition, embodiment 1 of the vehicle starting control system of this invention using face perception data can add a step of sending starting key result data from the black box module to the smart device and a step of displaying starting key result data on the display unit after S18.

Figure 6:
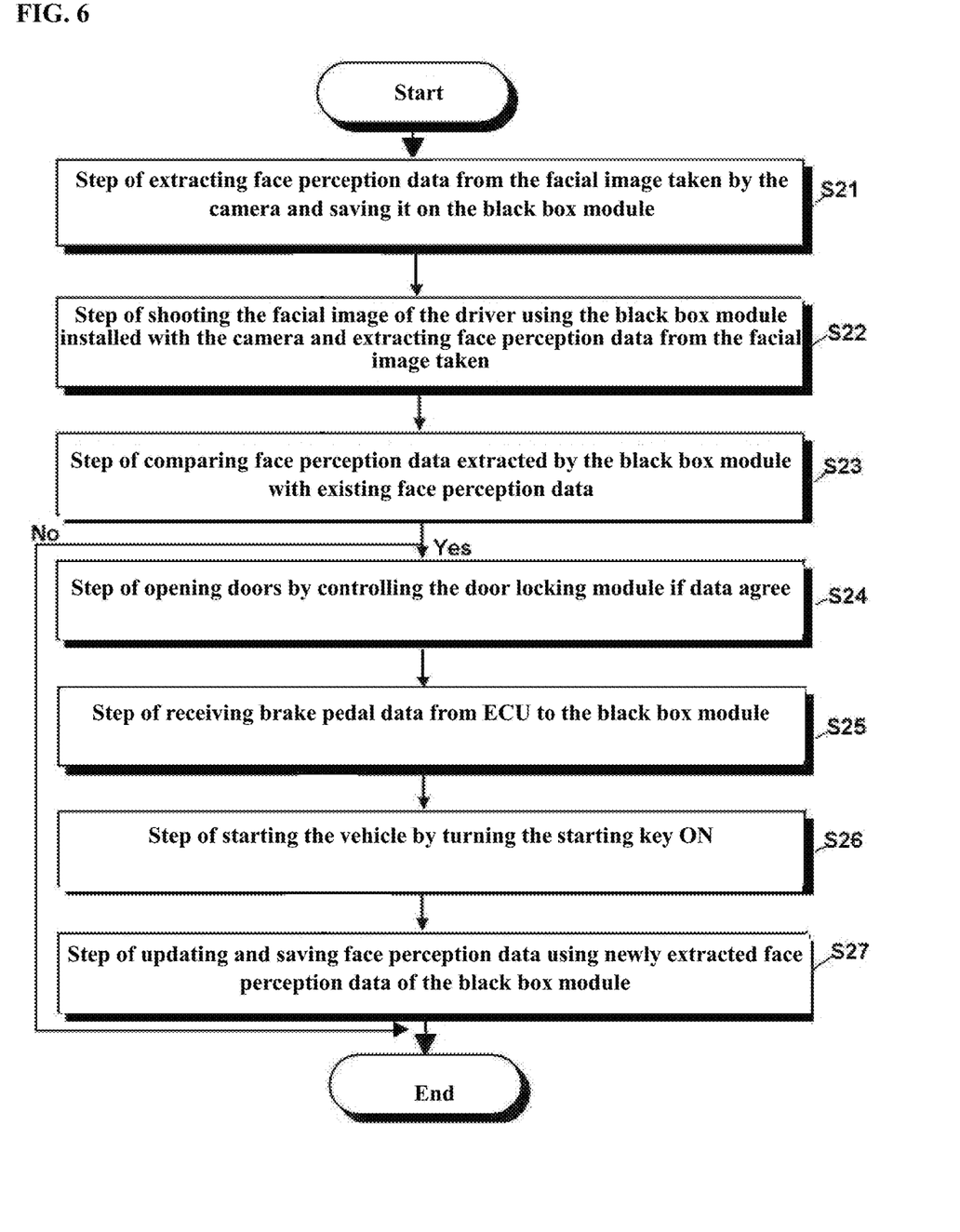
FIG. 6 is a flow chart illustrating embodiment 2 of the vehicle starting control system of this invention using face perception data.

FIG. 6 is a flow chart illustrating embodiment 2 of the vehicle starting control system of this invention using face perception data. In FIG. 6, embodiment 2 of the vehicle starting control system of this invention using face perception data includes a step (S21) of extracting face perception data from the facial image taken by the camera and saving it on the black box module, a step (S22) of shooting the facial image of the driver using the black box module installed with the camera and extracting face perception data from the facial image taken, a step (S23) of comparing face perception data extracted by the black box module with existing face perception data, a step (S24) of opening doors by controlling the door locking module, a step (S25) of receiving brake pedal data from ECU to the black box module, a step (S26) of starting the vehicle by turning the starting key ON, and a step (S27) of updating and saving face perception data using newly extracted face perception data of the black box module. In the above, vehicle stop status data can either be engine RPM of 0 or the starting key turned OFF. Face perception data is extracted from the facial image taken when the black box module camera shoots face of the driver and sends it after receiving engine RPM 0 or starting key OFF data. In addition, in step S25 above, brake pedal data represents status in which the driver is stepping on the brake pedal.

Figure 7:
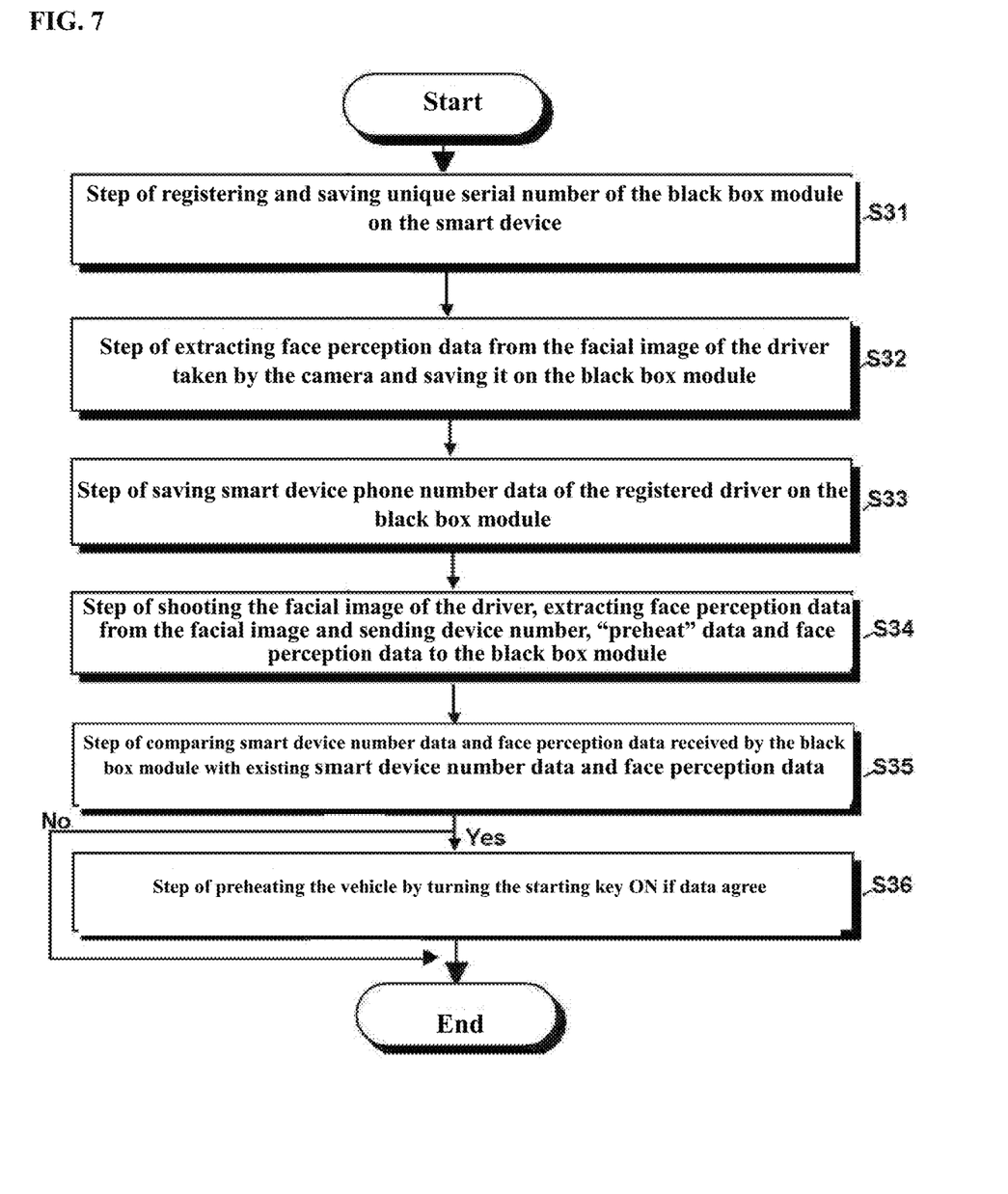
FIG. 7 is a flow chart illustrating embodiment 3 of the vehicle starting control system of this invention using face perception data.

FIG. 7 is a flow chart illustrating embodiment 3 of the vehicle starting control system of this invention using face perception data. In FIG. 7, embodiment 3 of the vehicle starting control system of this invention using face perception data includes a step (S31) of registering and saving unique serial number of the black box module on the smart device, a step (S32) of extracting face perception data from the facial image of the driver taken by the camera and saving it on the black box module, a step (S33) of saving smart device phone number data of the registered driver on the black box module, a step (S34) of shooting the facial image of the driver, extracting face perception data from the facial image and sending device number, "preheat" data and face perception data to the black box module, a step (S35) of comparing smart device number data and face perception data received by the black box module with existing smart device number data and face perception data, and a step (S36) of preheating the vehicle by turning the starting key ON if data agree. In addition, embodiment 3 of the vehicle starting control system of this invention using face perception data can add a step of sending starting key result data from the black box module to the smart device and a step of displaying starting key result data on the display unit after S36.

Figure 8:
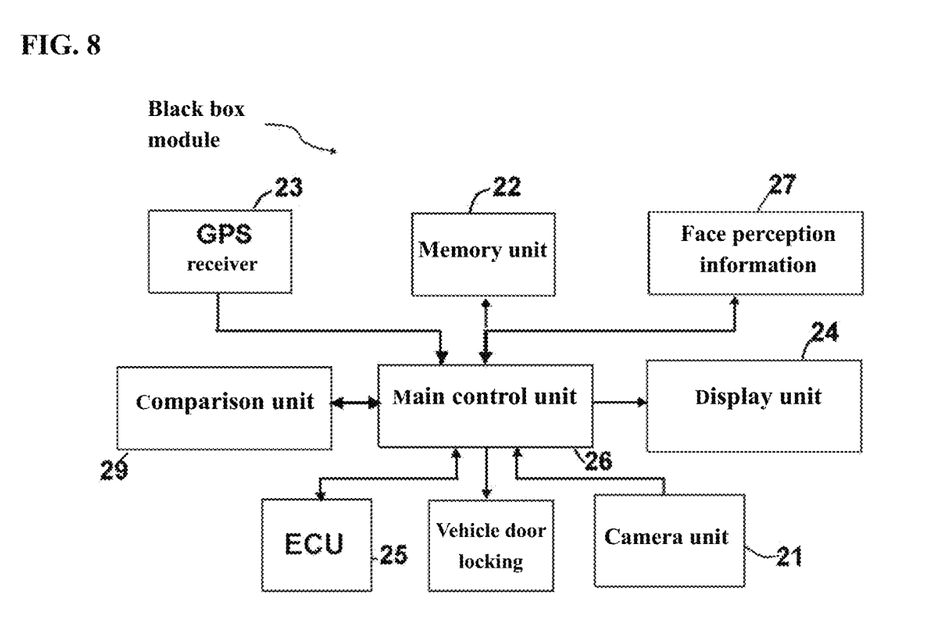
FIG. 8 is a detailed block diagram of the black box module applied to this invention.

FIG. 8 is a detailed block diagram of the black box module applied to this invention. In FIG. 8, the black box module applied to this invention is comprised of a camera unit (21) that shoots the front and rear sides of the vehicle and sends images to the control unit, a memory unit (22) that receives front and rear images from the camera unit and stores images with shooting time data and driver's face perception data, a GPS receiver (23) that provides time data to the control unit, an ECU (25) that sends brake pedal status data and starting key status data to the black box module by controlling the engine and automatic transmission ABS based on brake pedal data of the vehicle, accelerator status data, starting key ON, OFF data and engine RPM data, a face perception data extraction unit (27) that extracts face perception data from the facial image of the driver received from the camera, a comparison unit (29) that compares extracted face perception data with face perception data stored in the memory unit and determines whether they agree, a display unit (24) that displays camera image data and comparison result, and a main control unit (26) that controls the camera to shoot the front and rear sides, controls the memory unit to store image data by matching it with time data received from the GPS receiver, controls the face perception data extraction unit to extract face perception data by receiving the facial image taken by the camera at a stop, controls the comparison unit to determine whether extracted face perception data agrees with face perception data stored in the memory unit, controls the door locking module to open doors of the vehicle if data agree, and controls the starting key to be turned ON if brake pedal data received from ECU indicates that the driver stepped on the brake. In addition, the black box module above can add an authentication method that stores smart device number data in the memory unit along with face perception data and compares matching of stored smart device number with device number received from the smart device.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A vehicle starting control system using face perception data, comprising:
    a smart device (10) equipped with a camera which stores unique information of a black box module installed on a vehicle of a driver, takes an image of the driver, extracts face perception data from the image of the driver, stores the extracted face perception data, and sends the face perception data to the black box module;
    the black box module (20) which has a prestored smart device number of the smart device and prestored face perception data of the driver, receives smart device number of the smart device and the face perception data from the smart device, compares the received smart device number and face perception data with the prestored smart device number and face perception data, opens doors of the vehicle by controlling a vehicle door locking module if the received smart device number and face perception data match the prestored smart device number and face perception data, receives brake pedal information indicating that the driver steps on a brake pedal of the vehicle, and controls to turn on a starting key of the vehicle; and
    an internet or wireless communication network (30) which connects the smart device and the black box module.

2. A vehicle starting control system using face perception data, comprising:
    a black box module (20-1) which has prestored face perception data of a driver of a vehicle, extracts face perception data from the driver's image data taken by a camera (21-1) installed on the black box module, opens doors of the vehicle by controlling a door locking module if the extracted face perception data matches the prestored face perception data, and turns on a starting key of the vehicle when receiving brake pedal data indicating that the driver steps on a brake pedal of the vehicle from an electronic control unit (ECU); and
    the ECU which sends the brake pedal data to the black box module,
    wherein the black box module (20-1) comprises:
    a camera unit (21) that takes images of front and rear sides of the vehicle and sends the images to a control unit;
    a memory unit (22) that receives the front and rear images from the camera unit and stores the front and rear images with image-taking time data, and the driver's face perception data;
    a GPS receiver (23) that provides time data to the control unit;
    a face perception data extraction unit (27) that extracts face perception data from a facial image of the driver received from the camera;
    a comparison unit (29) that compares the extracted face perception data with the face perception data stored in the memory unit, and determines whether the extracted face perception data matches the stored face perception data;
    a display unit (24) that displays the image data taken by the camera and the comparison result; and
    a main control unit (26) that controls the camera to take the images of the front and rear sides, controls the memory unit to store the taken image data by matching the taken image data with the time data received from the GPS receiver, controls the face perception data extraction unit to extract the face perception data by receiving the facial image taken by the camera while the vehicle is being stopped, controls the comparison unit to determine whether the extracted face perception data matches the face perception data stored in the memory unit, controls the door locking module to open the doors of the vehicle if the extracted face perception data matches the face perception data stored in the memory unit, and controls the starting key to be turned on if the brake pedal data received from ECU indicates that the driver steps on the brake pedal.

3. A vehicle preheat control system using face perception data, comprising:
    a smart device (10-3) equipped with a camera which stores unique information of a black box module installed on a vehicle of a driver, takes an image of the driver, extracts face perception data from the image of the driver, stores the extracted face perception data, and sends the face perception data and "preheat" text data to the black box module;
    the black box module (20-3) which has a prestored smart device number of the smart device and prestored face perception data of the driver, receives the face perception data, the "preheat" text data, and smart device number data of the smart device from the smart device, compares the received smart device number and face perception data with the prestored smart device number and face perception data, and preheats the vehicle by turning on a starting key of the vehicle if the received smart device number and face perception data match the prestored smart device number and face perception data; and
    an internet or wireless communication network (30-3) which connects the smart device and the black box module.

4. A vehicle starting control method using face perception data, comprising:
    a step (S11) of registering and storing a unique serial number of a black box module of a vehicle of a driver in a smart device of the registered driver;

a step (S12) of extracting face perception data from a facial image of the registered driver taken by a camera and storing the face perception data in the black box module;

a step (S13) of storing smart number data of the smart device of the registered driver in the black box module;

a step (S14) of taking a facial image of a driver who wants to drive the vehicle, extracting face perception data from the facial image of the driver, and sending a device number of a smart device of the driver and the face perception data of the driver to the black box module;

a step (S15) of comparing the smart device number data and face perception data of the driver received by the black box module with the prestored smart device number data and face perception data;

a step (S16) of opening doors of the vehicle by controlling a door locking module if the smart device number data and face perception data of the driver received by the black box module match the prestored smart device number data and face perception data, a step (S17) of receiving brake pedal data from an electronic control unit (ECU) to the black box module; and a step (S18) of starting the vehicle by turning on a starting key of the vehicle.

5. A vehicle preheat control method using face perception data, comprising:

a step (S31) of registering and storing a unique serial number of a black box module of a vehicle of a driver in a smart device of the registered driver;

a step (S32) of extracting face perception data from a facial image of the registered driver taken by a camera and storing the face perception data in the black box module;

a step (S33) of storing phone number data of the smart device of the registered driver in the black box module;

a step (S34) of taking a facial image of a driver who wants to drive the vehicle, extracting face perception data from the facial image of the driver, and sending a device number of a smart device of the driver, "preheat" data and the face perception data of the driver to the black box module;

a step (S35) of comparing the smart device number data and face perception data of the driver received by the black box module with the prestored smart device number data and face perception data; and a step (S36) of preheating the vehicle by turning on a starting key of the vehicle if the smart device number data and face perception data of the driver received by the black box module match the prestored smart device number data and face perception data.

* * * * *